United States Patent
Shim et al.

(10) Patent No.: US 10,019,584 B2
(45) Date of Patent: Jul. 10, 2018

(54) PERFORMANCE OF IMAGE FORMING FUNCTIONS BASED ON ENCRYPTED DATA STORED IN VOLATILE MEMORY

(71) Applicant: S-PRINTING SOLUTION CO., LTD., Suwon-si, Gyeonggi-do (KR)

(72) Inventors: Wook-Jin Shim, Suwon-si (KR); Youn-jae Kim, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 162 days.

(21) Appl. No.: 15/066,691

(22) Filed: Mar. 10, 2016

(65) Prior Publication Data

US 2016/0378997 A1 Dec. 29, 2016

(30) Foreign Application Priority Data

Jun. 26, 2015 (KR) .................. 10-2015-0090904

(51) Int. Cl.
| | | |
|---|---|---|
| G06F 21/00 | (2013.01) | |
| G06F 21/60 | (2013.01) | |
| G06F 12/14 | (2006.01) | |
| G06F 21/55 | (2013.01) | |
| G06F 21/62 | (2013.01) | |
| G06F 21/71 | (2013.01) | |

(52) U.S. Cl.
CPC ........ *G06F 21/602* (2013.01); *G06F 12/1408* (2013.01); *G06F 21/556* (2013.01); *G06F 21/6245* (2013.01); *G06F 21/71* (2013.01); *G06F 2212/1052* (2013.01)

(58) Field of Classification Search
CPC .................................................... G06F 21/602
See application file for complete search history.

(56) References Cited

U.S. PATENT DOCUMENTS

| | | | | |
|---|---|---|---|---|
| 6,804,781 | B1 * | 10/2004 | Castro ................ | G06F 21/6245 360/15 |
| 6,862,583 | B1 * | 3/2005 | Mazzagatte ........... | G06F 21/608 380/51 |
| 7,264,411 | B2 * | 9/2007 | Matsunaga ........... | G06F 3/1222 358/1.15 |
| 7,292,355 | B2 * | 11/2007 | Jacobsen ............... | G06F 21/608 358/1.13 |
| 7,831,041 | B2 * | 11/2010 | Tanaka ..................... | H04K 1/00 380/44 |
| 8,330,979 | B2 * | 12/2012 | Kawara ................. | G06F 21/608 358/1.13 |
| 8,561,128 | B2 * | 10/2013 | Hirahara ............... | G06F 21/602 713/193 |
| 9,191,543 | B2 * | 11/2015 | Nagano .................... | H04N 1/32 |
| 9,363,078 | B2 * | 6/2016 | Taylor ................... | H04L 9/0618 |
| 9,930,207 | B2 * | 3/2018 | Sekine ................. | H04N 1/2104 |
| 2004/0141190 | A1 * | 7/2004 | Akashi ............... | H04N 1/00278 358/1.6 |

(Continued)

*Primary Examiner* — Ali Shayanfar
(74) *Attorney, Agent, or Firm* — Staas & Halsey LLP

(57) ABSTRACT

An image forming apparatus includes a function unit configured to perform a predetermined function, a volatile memory configured to store data which is necessary for performing the function of the function unit, and a controller configured to control the function unit using the encrypted data stored in the volatile memory, and to encrypt data to be stored in the volatile memory and write the data on a predetermined area of the volatile memory.

18 Claims, 10 Drawing Sheets

(56) References Cited

U.S. PATENT DOCUMENTS

| | | | |
|---|---|---|---|
| 2005/0201558 A1* | 9/2005 | Watanabe | G06F 21/602 380/211 |
| 2006/0001899 A1* | 1/2006 | Kanno | G06F 21/604 358/1.14 |
| 2007/0206798 A1* | 9/2007 | Isozaki | G11B 20/00086 380/277 |
| 2007/0223696 A1* | 9/2007 | Furuyama | G06K 19/073 380/239 |
| 2009/0110191 A1* | 4/2009 | Sanvido | H04L 9/0822 380/44 |
| 2009/0245516 A1* | 10/2009 | Ravikiran | H04L 9/0869 380/268 |
| 2011/0200188 A1* | 8/2011 | Ghouti | G06F 7/725 380/43 |
| 2012/0042157 A1* | 2/2012 | Leclercq | G06F 21/72 713/2 |
| 2015/0213273 A1* | 7/2015 | Yasukawa | G06F 21/6218 713/193 |
| 2015/0349958 A1* | 12/2015 | Lindell | H04L 9/085 713/168 |

* cited by examiner

PERFORMANCE OF IMAGE FORMING FUNCTIONS BASED ON ENCRYPTED DATA STORED IN VOLATILE MEMORY

CROSS-REFERENCE TO RELATED APPLICATIONS

This application claims priority from Korean Patent Application No. 10-2015-0090904, filed on Jun. 26, 2015, in the Korean Intellectual Property Office, the disclosure of which is incorporated herein by reference in its entirety.

BACKGROUND

1. Field

Apparatuses and methods disclosed herein relate to an image forming apparatus, a method for writing data thereof, and a non-transitory computer readable recording medium, and more particularly, to an image forming apparatus which may tighten security by encrypting data to be stored in a memory, a method for writing data thereof, and a non-transitory computer readable recording medium.

2. Description of the Related Art

With the development of semiconductor technology, System on Chip (SoC) technology for integrating a total system into a single chip is rapidly developing. To enhance the performance in the SoC using a multi-processor, a bus interface enhanced from the Advanced Microcontroller Bus Architecture 3.0 (AMBA 3.0) is applied as an interface between an SoC core and inner Intellectual Properties (IPs) and a memory controller.

The SoC integrated in the above-described structure provides advantages such as miniaturization, portability, low-power consumption, and cost savings. However, since unique information of the system and the user is stored in the memory, there is a problem that the information is likely to be leaked by hacking. The information leakage and worsening profit and loss caused by hacking the SoC and the system increase year by year. Accordingly, there is an increasing demand for a method for tightening security in the SoC system.

A related-art method for tightening security of a system is divided into three methods. The first method uses a compression algorithm. The compression algorithm is not appropriate as a method for tightening security since much information is exposed to the outside.

The second method uses a dedicated security master IP embedded in a processor to encrypt. The dedicated security master IP has various security-related algorithms implemented therein, and thus proceeds with encryption after reading out data stored in a memory. However, since data is stored in the memory as it is prior to being encrypted, the data may be easily leaked.

Finally, the third method assigns a different authority to every master IP, and thus allows a user to access a specific security area of the memory only when a master IP authorized to process contents requiring security is used. However, this method cannot prevent other master IPs having authority in the SoC from reading out data from the memory, and likewise, there is a problem that data which is not encrypted exists in the memory.

SUMMARY

Exemplary embodiments of the disclosure overcome the above disadvantages and other disadvantages not described above. Also, the disclosure is not required to overcome the disadvantages described above, and an exemplary embodiment of the disclosure may not overcome any of the problems described above.

The disclosure provides an image forming apparatus which encrypts data prior to writing the data on a memory so that encrypted data is written on the memory, and decrypts the data after reading out the encrypted data from the memory, a method for writing data thereof, and a non-transitory computer-readable recording medium.

According to an aspect of the disclosure, an image forming apparatus may include: a function unit configured to perform a predetermined function, a volatile memory configured to store data which is necessary for performing the function of the function unit, and a controller configured to control the function unit using the data stored in the volatile memory. The controller may be configured to encrypt data to be stored in the volatile memory and write the data on a predetermined area of the volatile memory.

The controller may include: a function controller configured to generate data to be used for the predetermined function of the function unit, an encryption unit configured to receive the generated data from the function controller and encrypt the received data, and a memory controller configured to write the encrypted data on the predetermined area of the volatile memory.

The encryption unit may be configured to determine whether to encrypt the data or not based on address information on which the data is to be written, and encrypt only data which is determined to be encrypted.

The encryption unit may be configured to determine whether to encrypt the data or not according to whether the address information corresponds to a secure area of the volatile memory or not.

The encryption unit may include a multiplexer, and the multiplexer may be configured to receive the data from the function controller, in response to the address information to store the data corresponding to a non-secure area of the volatile memory, determine not to encrypt the received data and transmit the data to the memory controller, and, in response to the address information to store the data corresponding to a secure area of the volatile memory, determine to encrypt the data in the encryption unit.

The multiplexer may include a buffer configured to store data, and, in response to the address information to write the data corresponding to the non-secure area of the volatile memory, the multiplexer is configured to store the received data in the buffer and transmit the data stored in the buffer to the memory controller after a predetermined operation clock.

The encryption unit may be configured to generate random number data and encrypt the data by inserting the generated random number data into the received data.

The encryption unit may be configured to detect repetition sections from the received data, and insert the random number data between the detected sections.

The encryption unit may be configured to process a plurality of data in parallel, and generate encrypted data in sequence in a pipeline method after a predetermined operation clock.

The image forming apparatus may further include a user interface configured to receive an input of a control command related to an encryption function, and the controller may be configured to activate or inactivate the function of the encryption unit based on the control command.

The function controller, the memory controller, and the encryption unit may be implemented by using an SoC.

The memory controller and the encryption unit may be implemented by using an SoC.

The memory controller may be configured to read out data from a predetermined area of the volatile memory, and, in response to the area from which the data is read out being a secure area of the volatile memory, the encryption unit may be configured to decrypt the read-out data and transmit the data to the function controller.

According to another aspect of the disclosure, a method for writing data of an image forming apparatus may include: receiving a function performance command of the image forming apparatus, generating data necessary for performing the function performance command, encrypting the generated data, and writing the encrypted data on a predetermined area of a volatile memory.

The encrypting may include determining whether to encrypt the generated data or not based on address information on which the generated data is to be written, and encrypting only data which is determined to be encrypted.

The encrypting may include determining whether to encrypt the data or not according to whether the address information corresponds to a secure area of the volatile memory or not.

The writing may include, in response to the address information corresponding to a non-secure area of the volatile memory, writing the generated data on a predetermined area of the volatile memory after a predetermined operation clock.

The encrypting may include generating random number data and encrypting the data by inserting the generated random number data into the generated data.

The encrypting may include: detecting repetition sections from the generated data, and inserting the random number data between the detected sections.

According to another aspect of the disclosure, a non-transitory computer readable recording medium may include a program for executing a method for writing data of an image forming apparatus, the method including: receiving a function performance command of the image forming apparatus, generating data necessary for performing the function performance command, encrypting the generated data, and writing the encrypted data on a predetermined area of a volatile memory.

According to various exemplary embodiments described above, all of the data requiring security and stored in the memory undergo through the encryption process. Accordingly, even if data stored in the memory is leaked by hacking, data having a meaningless dummy value is leaked, and thus security of the image forming apparatus may be effectively maintained.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and/or other aspects of the disclosure will be more apparent by describing certain exemplary embodiments of the disclosure with reference to the accompanying drawings, in which.

DETAILED DESCRIPTION

Figure 1:
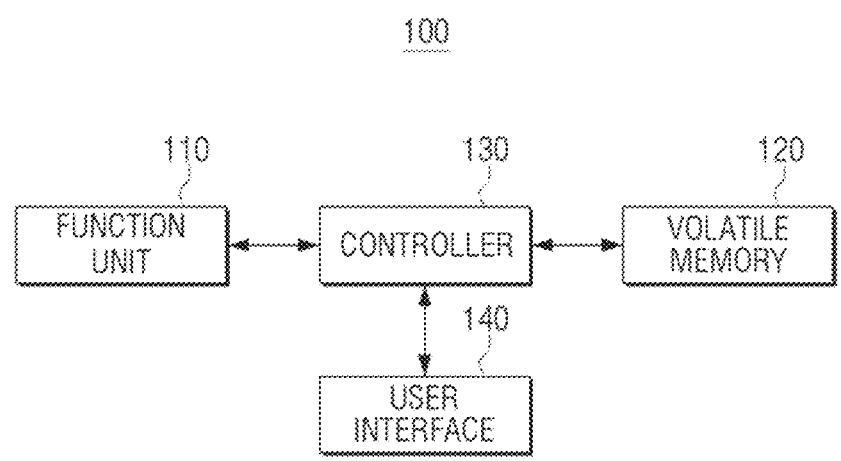
FIG. 1 is a block diagram to illustrate a configuration of an image forming apparatus according to an exemplary embodiment.

Exemplary embodiments of the disclosure will be described herein below with reference to the accompanying drawings, wherein like reference numerals refer to like elements throughout. The embodiments are described below to explain the disclosure by referring to the figures. In the following description, well-known functions or constructions are not described in detail since they would obscure the disclosure in unnecessary detail. Also, the terms used herein are defined according to the functions of the disclosure. Thus, the terms may vary depending on a user, an operator, or practice. That is, the terms used herein must be understood based on the descriptions made herein.

The terms "first", "second", etc. may be used to describe diverse components, but the components are not limited by the terms. The terms are only used to distinguish one component from the others.

The terms used in the disclosure are only used to describe the exemplary embodiments, but are not intended to limit the scope of the disclosure. The singular expression also includes the plural meaning unless it is specifically stated otherwise. In the disclosure, the terms "include" and "consist of" designate the presence of features, numbers, steps, operations, components, elements, or a combination thereof that are written in the specification, but do not exclude the presence or possibility of the addition of one or more other features, numbers, steps, operations, components, elements, or a combination thereof.

In the exemplary embodiment of the disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor.

Hereinafter, the disclosure will be described in detail with reference to the accompanying drawings.

FIG. 1 is a block diagram showing a configuration of an image forming apparatus 100 according to an exemplary embodiment. Referring to FIG. 1, the image forming apparatus 100 may include a function unit 110, a volatile memory 120, a controller 130, and a user interface unit 140.

Herein, the image forming apparatus 100 may be typically implemented by using a printer, a copier, a scanner, a facsimile machine, a multi function peripheral (MFP) which complexly implements functions of the above-mentioned devices through a single device, etc.

The function unit 110 performs a predetermined function. Specifically, the function unit 110 may include an image forming unit which outputs printing data, and may include a fax processing unit for performing a fax function when the image forming apparatus 100 supports the fax function such as transmitting and receiving a fax. In addition, the function unit 110 may include a scan processing unit for performing a scan function when the image forming apparatus 100 supports the scan function.

In addition, the function unit 110 may perform various functions to be processed to perform an image forming job, such as processing an image, and compressing or decompressing an image.

The volatile memory 120 stores data necessary for performing the function of the function unit 110. The volatile memory 120 according to an exemplary embodiment corresponds to an external memory rather than a memory (SiP) within a SoC chip. For example, the volatile memory 120 may store not only image data but also user information for charging. The volatile memory 120 may be implemented by using a Static Random Access Memory (SRAM), a Synchronous Dynamic RAM (SDRAM), a RAMBus, a DRAM, a DDR-SDRAM, etc.

The SRAM has the characteristic of maintaining data while power is supplied to the memory. The SRAM does not periodically require a re-writing operation, and thus may maintain the data by a single writing operation. The SRAM is a small capacity memory and thus its operation speed is very fast, but the SRAM has a disadvantage that it is expensive compared with the DRAM. Therefore, the SRAM is used in a device which requires a high speed but does not require high capacity like a cache memory.

Compared with the SRAM, the DRAM has the characteristic of having to perform a re-writing operation continuously to maintain data. Accordingly, the DRAM is a big capacity memory and is relatively slower than the SRAM, and is used in most of the systems as a main memory.

The SDRAM has the characteristic of operating synchronously, that is, in synchronization with a system clock. Theoretically, the SDRAM can synchronize with a system bus rate up to 200 MHz, and operates depending on the system clock and thus has the effect of improving a system speed.

The controller 130 controls the overall operation of the image forming apparatus 100. For example, the controller 130 may control the function unit 110 using the data stored in the volatile memory 120.

The controller 130 encrypts data to be stored in the volatile memory 120 and writes the data on a predetermined area of the volatile memory 120. Specifically, the controller 130 encrypts data first prior to writing the data on the volatile memory 120. Accordingly, since the data stored in the volatile memory 120 has been encrypted, personal information such as user information can be prevented from being leaked even when the volatile memory 120 is hacked.

A detailed configuration and operation of the controller 130 will be explained hereinbelow with reference to FIG. 2.

Figure 2:
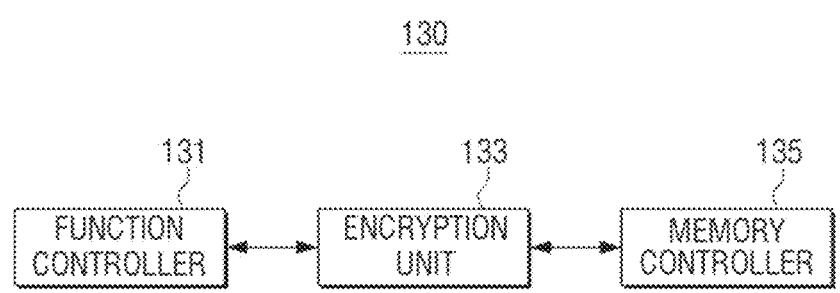
FIG. 2 is a block diagram to illustrate a configuration of a controller of the image forming apparatus according to an exemplary embodiment.

FIG. 2 is a block diagram to illustrate a configuration of the controller 130 of the image forming apparatus 100 according to an exemplary embodiment. Referring to FIG. 2, the controller 130 may include a function controller 131, an encryption unit 133, and a memory controller 135.

The function controller 131 generates data to be used for the predetermined function of the function unit 110. For example, the function controller 131 may be respective IPs which are implemented on a SoC.

The memory controller 135 writes the encrypted data on a predetermined area of the volatile memory 120. In addition, the memory controller 135 may read out data from the predetermined area of the volatile memory 120.

The encryption unit 133 receives the data generated in the function controller 131, and encrypts the received data. In addition, the encryption unit 133 decrypts the encrypted data which is read out from the volatile memory 120 by the memory controller 135.

Since all of the data generated in the function controller 131 does not need encryption, the encryption unit 133 may determine whether to encrypt or not according to the data. For example, the encryption unit 133 may determine whether to encrypt or not based on address information in the volatile memory 120 on which data will be written. The encryption unit 133 encrypts only the data which is determined to be encrypted, and thus can reduce unnecessary operations.

The area of the volatile memory 120 may be set as a secure area and a non-secure area. For example, the secure area may be set to allow only IPs which are authorized in a SoC core to access. The encryption unit 133 analyzes address information included in the generated data, and determines whether the data is data to be stored in the secure area of the volatile memory 120. In response to the address information being determined to correspond to the secure area of the volatile memory 120, the encryption unit 133 may determine to encrypt the data. To the contrary, in response to the address information being determined to correspond to the non-secure area of the volatile memory 120, the encryption unit 133 may determine not to encrypt the data.

Figure 3:
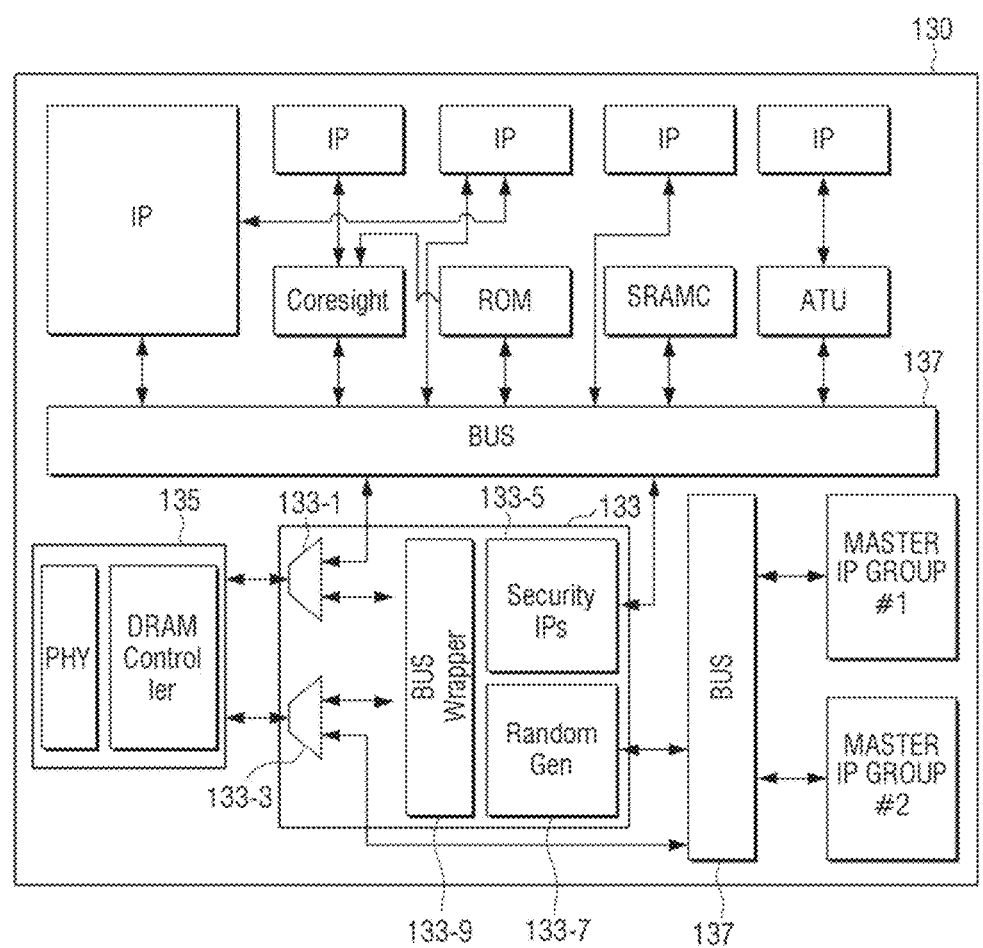
FIG. 3 is a block diagram to illustrate the controller which is implemented by using an SoC according to an exemplary embodiment.

For example, the encryption unit 133 may transmit the received data to an encryption proceeding module regardless of whether to encrypt the data or not. In another example, the encryption unit 133 may include a multiplexer (MUX) 133-1 as shown in FIG. 3 for example, and distinguish the data determined not to be encrypted in the multiplexer 133-1 and transmit the data to the memory controller 135 without passing through the encryption proceeding module.

The multiplexer 133-1 may receive the data generated in the function controller 131. In addition, the multiplexer 133-1 may determine which area of the volatile memory 120 corresponds to address information to store the received data. In response to the address information being determined to correspond to the secure area of the volatile memory 120, the multiplexer 133-1 may transmit the data to the encryption proceeding module. Accordingly, the data may be encrypted in the encryption unit 133.

To the contrary, in response to the address information being determined to correspond to the non-secure area of the volatile memory 120, the multiplexer 133-1 may directly transmit the data to the memory controller 135 without transmitting the data to the encryption proceeding module.

For example, the multiplexer 133-1 may include a buffer or a stack memory which stores the data determined not to be encrypted. The multiplexer 133-1 stores the data determined not to be encrypted in the buffer, and transmit the data stored in the buffer to the memory controller 135 after a predetermined operation clock. The reason why the data is transmitted after the predetermined operation clock is to match with a clock required to encrypt the data. That is, by generating a delay, the data can be transmitted to the memory controller 135 in the same order as when the data is transmitted to the encryption unit 133 regardless of whether the data is encrypted or not.

The encryption unit 133 may generate random number data and encrypt the data by inserting or adding the random number data to the data received from the function controller 131.

The random number data may be generated through a separate random number generator. The reason why the random number is inserted is to add randomness before the data generated in the function controller 131 is written on the volatile memory 120. Since data having a regular pattern is vulnerable to external attack when the data is repeatedly written on the memory, the encryption unit 133 may add or insert the random number.

The encryption unit 133 may detect repetition sections from the data received from the function controller 131. In addition, the encryption unit 133 may insert the random number data between the detected sections. For example, when data corresponding to a regular address number is the same as much as a predetermined width, the encryption unit 133 may determine the data corresponding to the predetermined width as the repetition section to insert the random number data. A period and a range for this determination may be variably set, and a plurality of settings may be used using a lookup table (LUT).

In another example, the encryption unit 133 may generate encryption data of 128 bits. In this case, however, in response to the data generated in the function controller 131 being smaller than 128 bits, the encryption unit 133 may fill the data with the random number as many as a difference in the number of bits. It may be variably determined which area the random number is inserted or added to, and a plurality of settings may be used using a lookup table. A parity bit may be added to the header of the data.

When the encryption unit 133 accesses the volatile memory 120, the encryption unit 133 may frequently perform burst transaction as well as single transaction. Therefore, the encryption unit 133 may process a plurality of data in parallel, encrypt the plurality of data in sequence in a pipeline method after the predetermined operation clock, and transmit the data.

The image forming apparatus 100 may include a user interface unit 140 to receive a user input. The user interface unit may receive a control command related to the encryption function. The controller 130 may activate or inactivate the function of the encryption unit 133 based on the input control command.

For example, through the control command, the user may control to encrypt the data to be stored in the non-secure area. The user interface unit may provide a UI for selecting which of the secure area and the non-secure area data is to be stored in.

In addition, the data may be encrypted and stored in an external storage device which may interface with the image forming apparatus 100, such as an HDD, a USB memory, etc., in addition to each area of the volatile memory 120 of the image forming apparatus 100. The user interface unit may provide a UI for setting a function of encrypting data and storing the data in the external storage devices.

In another example, the encryption unit may proceed with encryption partially in response to a user input. If a user command to select data to be encrypted is input through the user interface unit, the encryption unit 133 may proceed with encryption with respect to the selected data only.

In another example, if security protection is established for the entire area of an external storage device (for example, hard disk, removable disk, memory card, USB memory, etc.), a specific drive (for example, D drive) or a specific folder, the encryption unit 133 may decide to encrypt data stored in the parts where security protection is established without a user command through the user interface unit.

A process of reading out and decrypting data is performed to correspond to the process of encrypting the data and then writing the data. The memory controller 135 may read out the data from a predetermined area of the volatile memory 120. In response to the encrypted data being read out, the encryption unit 133 may decrypt the data and transmit the data to the function controller 131.

The encryption unit 133 may determine whether it is necessary to decrypt the read-out data or not with reference to the area from which the data is read out. For example, in response to the data being read out from the secure area, the encryption unit 133 may decrypt the read-out data and transmit the data to the function controller 131. To the contrary, in response to the data being read out from the non-secure area, the encryption unit 133 does not decrypt the read-out data and transmit the data to the function controller 131 after the predetermined operation clock. The encryption unit 133 may include a demultiplexer 133-3 corresponding to the multiplexer 133-1.

According to an exemplary embodiment, the function controller 131, the encryption unit 133, and the memory controller 135 may be implemented by using a SoC. According to another exemplary embodiment, only the encryption unit 133 and the memory controller 135 may be implemented by using a separate SoC. That is, the encryption unit 133 and the memory controller 135 may be implemented by using a SoC which receives data from another SoC and performs only the encryption function.

Hereinafter, the function controller 131, the encryption unit 133, and the memory controller 135 which are implemented by using the SoC according to an exemplary embodiment will be explained by way of an example.

FIG. 3 is a block diagram to illustrate the controller 130 which is implemented by using a SoC according to an exemplary embodiment. The function controller 131 is implemented by using respective IPs such as a master IP group, etc. The respective IPs of the function controller 131 may be connected to the encryption unit 133 directly or via a bus 137.

For example, the encryption unit 133 may include an encryption module 133-5 which is responsible for encrypting, a random number generator 133-7, a bus interface 133-9, a multiplexer 133-1, and a demultiplexer 133-3. In FIG. 3, the encryption module 133-5 may be expressed by an AES which is a representative encryption algorithm. In addition, in FIG. 3, the bus interface module 133-9 may be expressed by a bus wrapper.

A related-art SoC has a structure in which respective IPs are directly connected with a memory controller. However, as shown in FIG. 3, the SoC according to an exemplary embodiment has a structure in which the respective IPs of the function controller 131 have no choice but to pass through the encryption unit 133 to transmit data to the memory controller 135. Therefore, there is an effect that the data is encrypted on a bus prior to being written on the memory. In addition, when data is read out from the memory, there is an effect that the encrypted data is read out and then is decrypted prior to being loaded onto the bus.

In addition, data which does not require encryption may be transmitted through the encryption module or the multiplexer 133-1/demultiplexer 133-3. The data which does not require encryption may be stored in the buffer during a predetermined clock until an effective clock arrives. The buffer may be included in the multiplexer 133-1/demultiplexer 133-3, or may be included in the encryption module 133-5.

Figure 4:
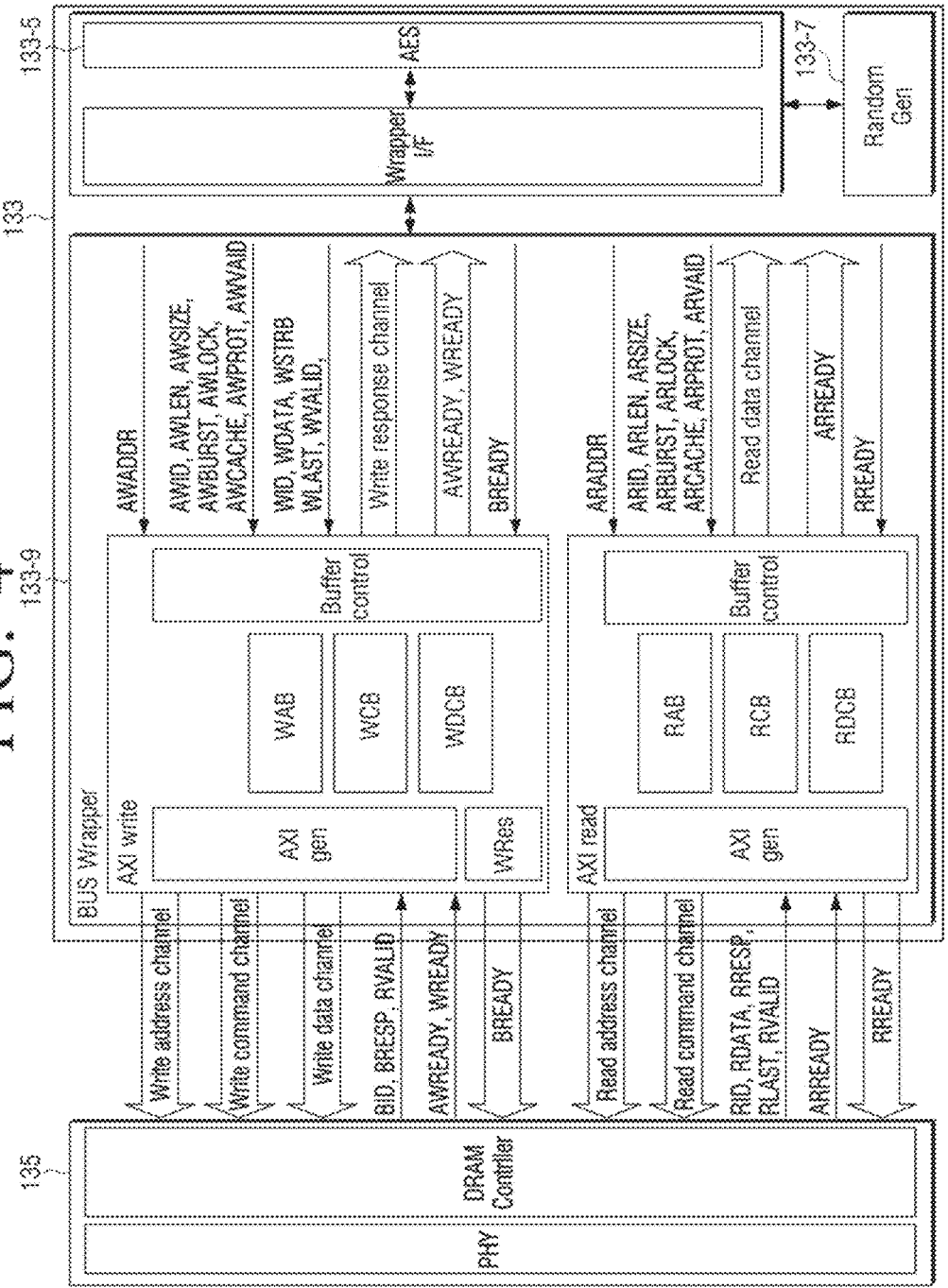
FIG. 4 is a view to illustrate a bus interface operation between a memory controller and an encryption unit.

FIG. 4 is a view showing the bus interface 133-9 of the encryption unit 133 in detail. For example, the bus interface 133-9 may be implemented by using an Advanced eXtensible Interface (AXI). The bus interface 133-9 may include, according to the AXI protocol specification, an AXI write module including a write address channel, a write data channel, and a write response channel, and an AXI read module including a read address channel and a read data channel.

In the AXI write module, all of the write address, command, and data are given by cores or master IPs, a part interfacing with them may be defined as a slave port. In addition, a part interfacing with a slave IP such as the memory controller 135 may be defined as a master port. In addition, since the write response channel is sent by the slave IP, a part interfacing with the write response channel is defined as a slave port, and a part interfacing with the core or the master IP may be defined as a master port.

However, since the data is given by the slave IP such as the memory controller 135 contrary to the AXI write module, a part interfacing with the data may be defined as a slave port, and a part interfacing with the core or master IP may be defined as a master port.

A READY signal corresponding to each channel may be defined as shown in FIG. 4. Referring to FIG. 4, the AXI write module may include a write address buffer (WAB), a write command buffer (WCB), a write data command buffer (WDCB), a buffer control module, an AXI gen, a write response (WRes). The WAB, WCB, and WDCB may store initially generated memory write transmission first regardless of single or burst transaction. The buffer control module may manage the three buffers, namely, the WAB, WCB, and WDCB.

The buffer control module may transmit the data in the buffer to the AXI gen module after a predetermined operation clock since the data has been initially stored. The predetermined operation clock may be defined as a time which is taken until initially input data is encrypted and outputted. For example, when an AES-128 encryption method is used, 11 clocks may be the predetermined operation clock. This is because the AES-128 encryption method proceeds with an encryption process of 10 rounds. However, in the AES-128 encryption method, since the encryption process may proceed once in two rounds, six clocks may be the predetermined operation clock. As described above, since the operation clock varies according to the encryption method, the predetermined operation clock is not limited to 11 clocks as explained below. For example, the encryption unit 133 may use a block cipher such as AES, DES, 3DES, and an algorithm such as SHA1, SHA256, SHA384, SHA512, and an RSA.

In addition, the buffer control module may check a transmission state by identifying AWREADY or WREADY which is exchanged between the cores or the master IPs during every clock.

The AXI gen module serves as a new master port and may generate new AXI transmission with the slave IP such as the memory.

The WRes serves to identify a response of a slave regarding the new transmission through the AXI gen, and transmit the response to the original core or master IP.

The memory or buffer which stores the non-encrypted data until an effective clock is generated (including a stack memory) may store write data in the form of Write Data Buffer (WDB) and read data in the form of Read Data Buffer (RDB).

Figure 5:
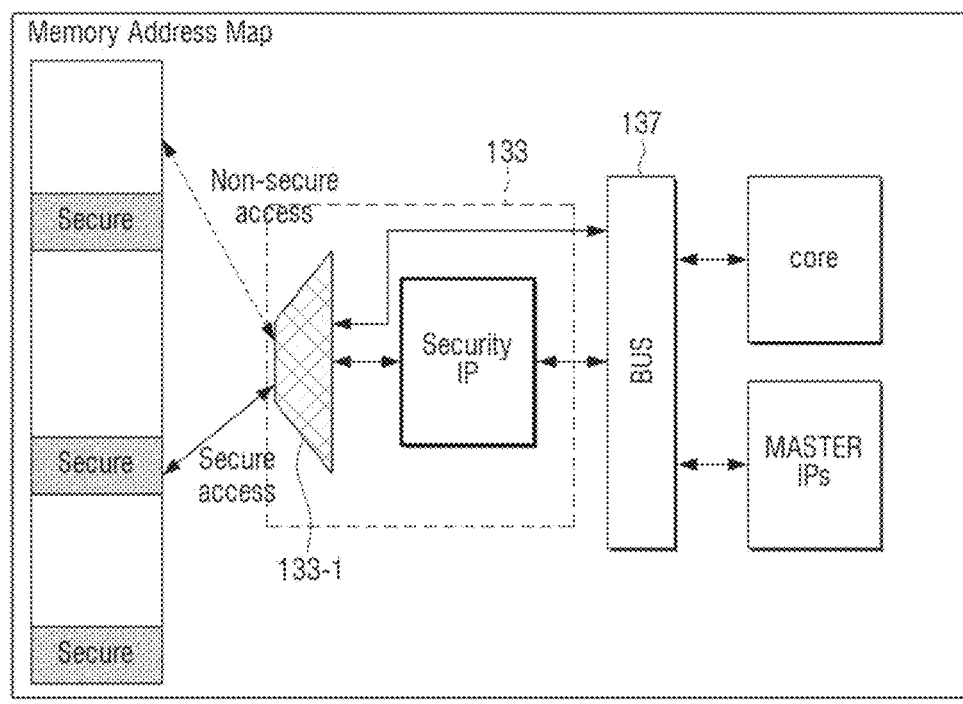
FIG. 5 is a view to illustrate an operation of accessing a secure area and a non-secure area using a multiplexer.

FIG. 5 is a view to illustrate an operation of accessing a secure area and a non-secure area using the multiplexer 133-1.

The multiplexer 133-1 may distinguish between encrypted data and non-encrypted data, and transmit the data to the memory controller 135. When accessing a predetermined secure area from among the entire memory areas (memory map) and writing data, the multiplexer 133-1 may transmit the data which has been encrypted through the encryption module to the memory controller 135. In addition, when accessing the non-secure area, the multiplexer 133-1 may store the data received from the function controller 131 in the stack memory or the buffer in the multiplexer 133-1 until an effective clock arrives, and then may transmit the data to the memory controller 135 in synchronization with the effective clock.

To the contrary, when data is read out from the memory, the demultiplexer 133-3 may perform a corresponding function. When encrypted data is read out, the demultiplexer 133-3 may transmit the data to the encryption module to decrypt the data. When non-encrypted data is read out, the demultiplexer 133-3 may store the data in the stack memory or the buffer in the demultiplexer 133-3 until an effective clock is generated. Thereafter, the demultiplexer 133-3 may transmit the data to the function controller 131 in response to the effective clock being generated.

The stack memory or the buffer is not limited to being implemented in the multiplexer 133-1 and the demultiplexer 133-3, and may be implemented in the encryption module.

Figure 6A:
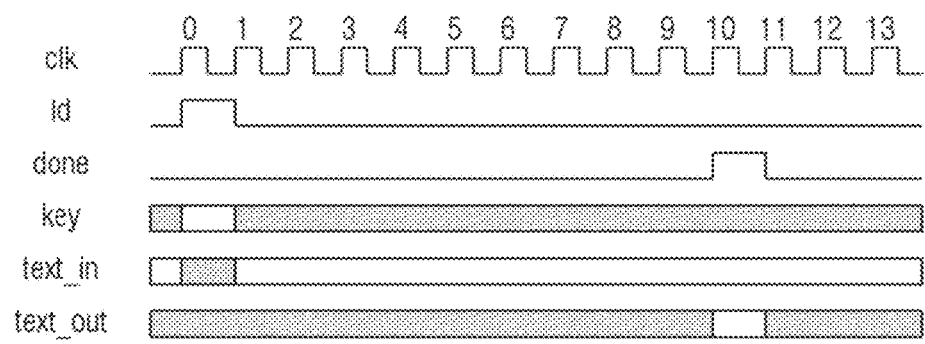
FIGS. 6A and 6B are views showing encryption and decryption processes with clock timing according to an exemplary embodiment.
Figure 6B:
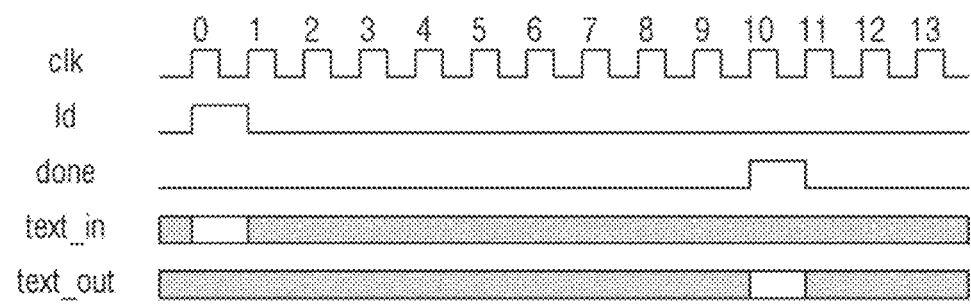

FIGS. 6A and 6B are views showing time which is required to encrypt and decrypt in an AES-128 algorithm from among various encryption algorithms used in the image forming apparatus 100 with the number of clocks according to an exemplary embodiment. FIG. 6A is a view showing an encryption process, and FIG. 6B is a view showing a decryption process. As described above, in the AES-128 algorithm, the encryption or decryption process proceeds in 10 rounds and thus 11 clocks are required.

For example, the encryption unit 133 may include a control part for controlling AES encryption and decryption, a part for expanding a key value through scheduling, and a part for inputting and output a text.

An Id entering the control module serves to inform of a time at which a plain text to be encrypted enters as an input. When the plain text is completely encrypted, a done which is an output signal of the control module is generated. In addition, a key expansion module may receive the key value used for encryption, and proceeds with a key expansion operation and applies the key value to every round of the encryption. An initial permutation module stores the inputted plain text in a flip flop (F/F), and a round permutation module proceeds with encryption through 10 rounds in total. Finally, a final permutation module may finally output the encrypted data.

Figure 7:
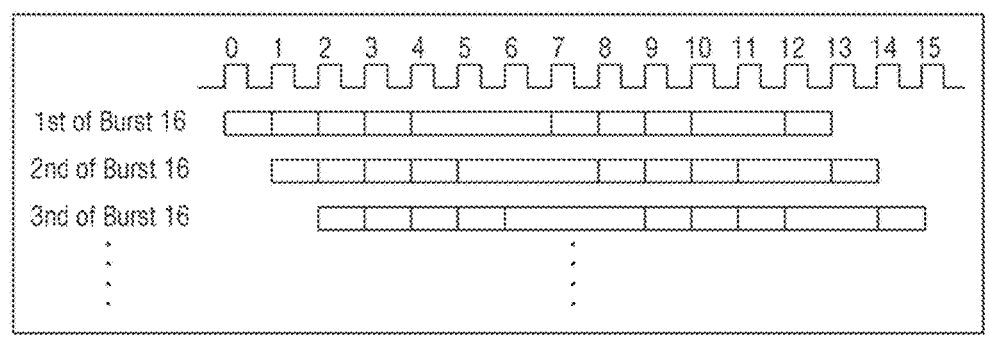
FIG. 7 is a view to illustrate encrypting by processing data in parallel in a pipeline method.

FIG. 7 is a view to illustrate encrypting by processing data in parallel in a pipeline method. When the function controller 131 such as the core or master IPs accesses the volatile memory 120, the burst transaction as well as the single transaction is frequently used, and thus the pipeline method may be required.

When encrypted data is written on the memory, all of the data which have been encrypted in the encryption unit 133 is continuously carried on the bus after the predetermined operation clock regardless of the single transaction or the burst transaction. In addition, when encrypted data is read out from the memory, the data which has been decrypted in the encryption unit 133 is carried on the bus after the predetermined operation clock regardless of the single transaction or the burst transaction as in the encryption.

This operation may be performed in the bus interface (the bus wrapper block) 133-9 of the encryption unit 133. When the AXI protocol used in the bus interface 133-9 is used, the encryption unit 133 may control AWVALID, AWREADY, WVALID, WREADY when writing the data on the memory. In addition, the encryption unit 133 may normally control ARVALID, ARREADY, RVALID, and RREADY when reading the data from the memory.

While the bus is monitored, data may not be transmitted at every clock signal, and the first burst transaction may be delayed during clocks 4-7 as shown in FIG. 7. In this case, in order to maintain the pipeline method, the second and third burst transactions which are processed in parallel may be delayed during corresponding clocks. For example, the second burst transaction may be delayed during clocks 5-8. The encryption unit 133 may transmit the data in response to an effective operation clock signal being generated in the middle of monitoring the bus.

As described above, through the image forming apparatus 100 according to various exemplary embodiments, security may be improved and personal information or product information may be prevented from being leaked by hacking.

Figure 8:
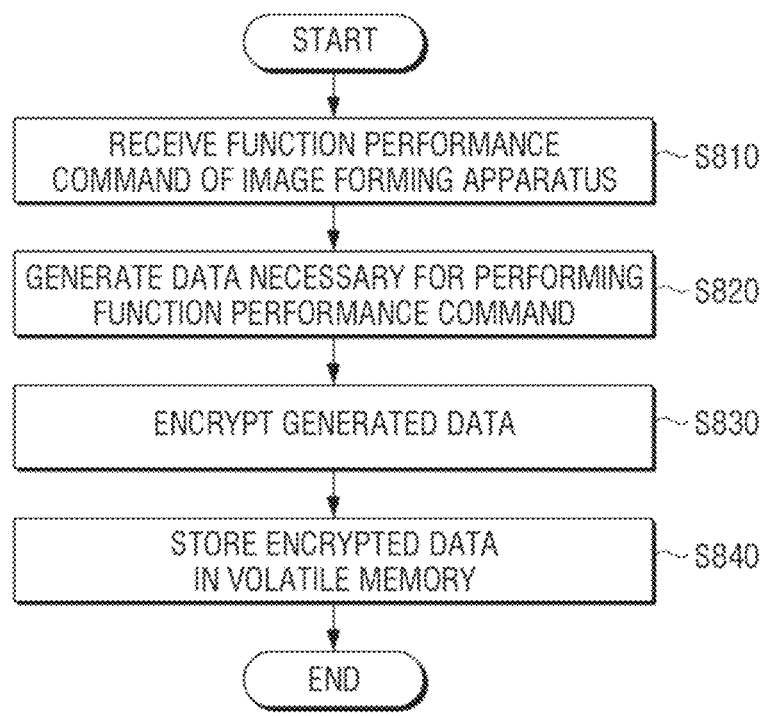
FIGS. 8 and 9 are flowcharts to illustrate a method for writing data of an image forming apparatus according to various exemplary embodiments.
Figure 9:
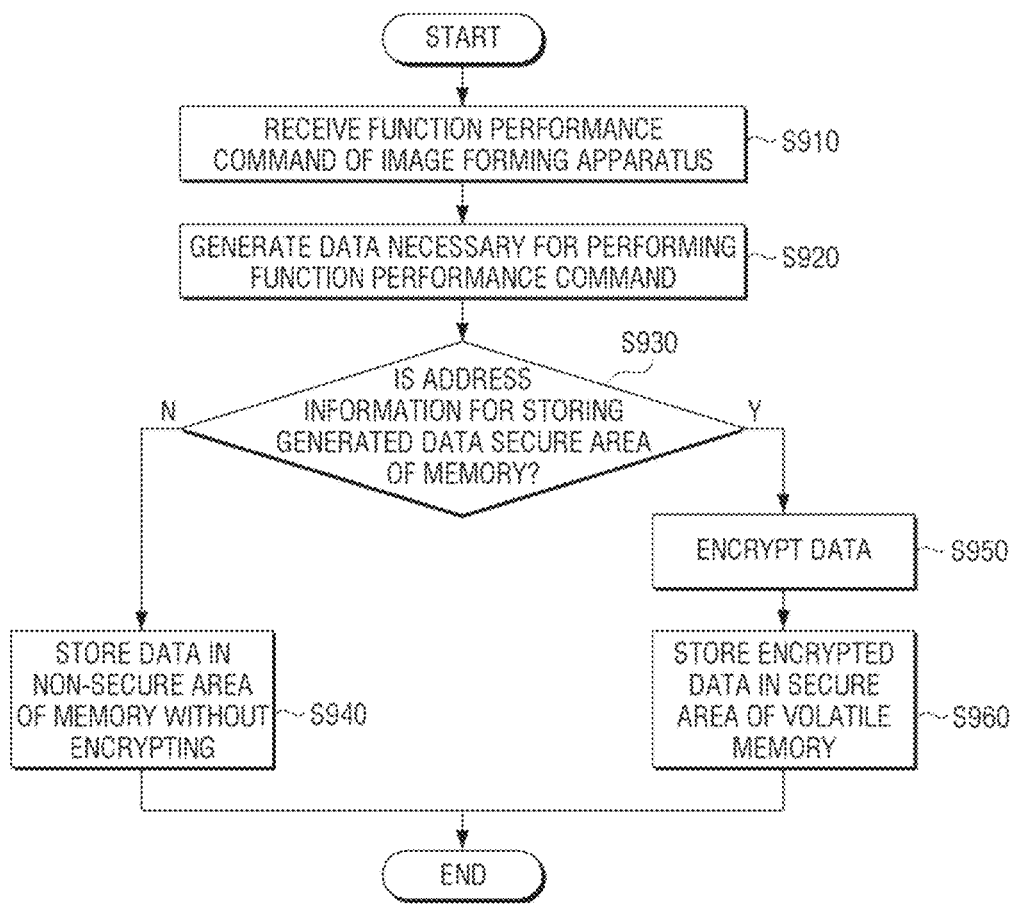

FIGS. 8 and 9 are flowcharts to illustrate a method for writing data of the image forming apparatus 100 according to various exemplary embodiments.

Referring to FIG. 8, the image forming apparatus 100 receives a command to perform the function of the image forming apparatus 100 first (S810). Next, the image forming apparatus 100 generates data necessary for performing the received command (S820). The image forming apparatus 100 encrypts the generated data prior to writing the data on the memory (S830). Thereafter, the image forming apparatus 100 stores the encrypted data in the volatile memory 200.

Referring to FIG. 9, according to another exemplary embodiment, the image forming apparatus 100 performs operations S910 and S920 which are the same as operations S810 and S820 shown in FIG. 8. The image forming apparatus 100 may determine whether to encrypt the generated data or not based on address information on which the generated data will be written. In addition, the image forming apparatus 100 may encrypt only the data which is determined to be encrypted based on the address information on which the generated data will be written.

The image forming apparatus 100 may determine whether the address information to store the generated data corresponds to a secure area of the volatile memory 120 or not (S930). In response to the address information corresponding to a non-secure area of the volatile memory 120 (S930-N), the image forming apparatus 100 may write data generated after a predetermined operation clock on the non-secure area of the volatile memory 120 (S940). To the contrary, in response to the address information corresponding to the secure area of the volatile memory 120 (S930-Y), the image forming apparatus 100 may encrypt the generated data (S950). In addition, the image forming apparatus 100 may write the encrypted data on the secure area of the volatile memory 120 (S960). Various exemplary embodiments regarding other methods for writing data of the image forming apparatus 100 are the same or similar to the embodiments of the image forming apparatus 100, and a redundant explanation is omitted.

In addition, a program code for performing the method for writing data according to various exemplary embodiments described above may be stored in various types of recording media including a non-transitory computer readable recording medium. Specifically, the program code may be stored in various types of terminal readable recording media such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, a CD-ROM, The foregoing exemplary embodiments and advantages are merely exemplary and are not to be construed as limiting the disclosure. The teachings disclosed herein may be readily applied to other types of apparatuses. Also, the description of the exemplary embodiments of the disclosure is intended to be illustrative, and not to limit the scope of the claims, and many alternatives, modifications, and variations will be apparent to those skilled in the art without departing from the principles and spirit of the disclosure, the scope of which is defined in the claims and their equivalents.

What is claimed is:

1. An image forming apparatus, comprising:
   a volatile memory; and
   a controller to encrypt data to be used to perform a predetermined function of the image forming apparatus before the data is written to the volatile memory, to write the encrypted data to a predetermined area of the volatile memory, and to control the image forming apparatus to perform the predetermined function using the encrypted data written to the predetermined area of the volatile memory,
   wherein the controller comprises:
      a function controller to generate the data to be used to perform the predetermined function of the image forming apparatus, and
      an encrypter to receive the generated data from the function controller, to determine whether to encrypt the generated data based on address information on which the generated data is to be written, and to encrypt the generated data which is determined to be encrypted based on the address information.

2. The image forming apparatus of claim 1, wherein the controller further comprises:
   a memory controller to write the encrypted data to the predetermined area of the volatile memory.

3. The image forming apparatus of claim 1, wherein the encrypter is to determine whether to encrypt the generated data according to whether the address information corresponds to a secure area of the volatile memory.

4. The image forming apparatus of claim 2, wherein
   the encrypter comprises a multiplexer to receive the generated data from the function controller, and
   if the multiplexer determines address information to write the generated data to the volatile memory corresponds to a non-secure area of the volatile memory, the multiplexer determines not to encrypt the generated data and to transmit the generated data to the memory controller, and,
   if the multiplexer determines the address information to write the generated data to the volatile memory corresponds to a secure area of the volatile memory, the multiplexer determines to encrypt the generated data in the encrypter.

5. The image forming apparatus of claim 4, wherein
   the multiplexer comprises a buffer to store the generated data, and if the multiplexer determines the address information to write the generated data corresponds to the non-secure area of the volatile memory, the multiplexer is to store the generated data in the buffer and to transmit the generated data stored in the buffer to the memory controller after a predetermined operation clock.

6. The image forming apparatus of claim 2, wherein the encrypter is to generate random number data and encrypt the generated data by inserting the generated random number data into the generated data.

7. The image forming apparatus of claim 6, wherein the encrypter is to detect repetition sections from the generated data, and insert the random number data between the detected repetition sections.

8. The image forming apparatus of claim 2, wherein the encrypter is to process a plurality of generated data in parallel, and generate encrypted data in sequence in a pipeline method after a predetermined operation clock.

9. The image forming apparatus of claim 2, further comprising a user interface to receive an input of a control command related to an encryption function,
wherein the controller is to activate or inactivate the function of the encrypter based on the control command.

10. The image forming apparatus of claim 2, wherein the function controller, the memory controller, and the encrypter are implemented by using an SoC.

11. The image forming apparatus of claim 2, wherein the memory controller and the encrypter are implemented by using an SoC.

12. The image forming apparatus of claim 2, wherein
the memory controller is to read out data from an area of the volatile memory, and
if the area from which the data is read out is a secure area of the volatile memory, the encrypter is to decrypt the read-out data and transmit the data to the function controller.

13. A method for writing data of an image forming apparatus, the method comprising:
receiving a command to perform a function of the image forming apparatus;
generating data to be used to perform the function of the image forming apparatus based on the command;
encrypting the generated data before the generated data is written to a volatile memory; and
writing the encrypted data to a predetermined area of the volatile memory; and
performing the function of the image forming apparatus using the encrypted data written to the predetermined area of the volatile memory,
wherein the encrypting comprises determining, by an encrypter, whether to encrypt the generated data based on address information on which the generated data is to be written, and encrypting the generated data which is determined to be encrypted.

14. The method of claim 13, wherein the encrypting comprises determining whether to encrypt the generated data according to whether the address information corresponds to a secure area of the volatile memory.

15. An image forming apparatus, comprising:
an image forming unit to perform a function relating to at least one of a print job, a scan job, and a fax job; and
a controller to generate data to be used to perform the function in response to reception of a command to perform the function, to selectively encrypt the generated data before the generated data is written to a volatile memory, and to write the selectively encrypted data to the volatile memory,
wherein
the controller comprises an encrypter to determine whether address information included with the generated data corresponds to a secure area of the volatile memory or a non-secure area of the volatile memory and to selectively encrypt the generated data according to whether the address information included with the generated data corresponds to the secure area of the volatile memory or the non-secure area of the volatile memory.

16. The image forming apparatus of claim 15, wherein
if the encrypter determines the address information included with the generated data corresponds to the secure area of the volatile memory, the encrypter encrypts the generated data, and
if the encrypter determines the address information included with the generated data corresponds to the non-secure area of the volatile memory, the encrypter writes the generated data to the volatile memory without performing encryption of the generated data.

17. The image forming apparatus of claim 16, wherein
the controller further comprises a function controller to transmit the generated data to the encrypter, and
if a portion of the generated data corresponds to the non-secure area of the volatile memory and another portion of the generated data corresponds to the secure area of the volatile memory, the encrypter generates a delay before writing the generated data corresponding to the non-secure area of the volatile memory so that the generated data corresponding to the non-secure area of the volatile memory and the generated data corresponding to the secure area of the volatile memory are written to the volatile memory in a same order as the generated data is transmitted from the function controller to the encrypter.

18. The image forming apparatus of claim 15, wherein the volatile memory is external to the image forming apparatus.

* * * * *

UNITED STATES PATENT AND TRADEMARK OFFICE
CERTIFICATE OF CORRECTION

PATENT NO.         : 10,019,584 B2
APPLICATION NO.    : 15/066691
DATED              : July 10, 2018
INVENTOR(S)        : Wook-Jin Shim et al.

Page 1 of 1

It is certified that error appears in the above-identified patent and that said Letters Patent is hereby corrected as shown below:

In the Drawings

In sheet 4 of 10, FIG. 4, reference numeral 135, Line 2, delete "Contrller" and insert -- Controller --, therefor.

Signed and Sealed this
Eighth Day of January, 2019

Andrei Iancu
*Director of the United States Patent and Trademark Office*